United States Patent Office 3,097,168
Patented July 9, 1963

3,097,168
GELLING HYDROCARBON LIQUIDS
Daniel L. Gibson, Tulsa, Okla., assignor to The Dow Chemical Company, Midland, Mich., a corporation of Delaware
No Drawing. Filed July 8, 1960, Ser. No. 41,479
4 Claims. (Cl. 252—8.55)

The invention provides an improved method of gelling hydrocarbon liquids particularly petroliferous liquids to render them non-flowable and to impart to them the capacity of blocking or plugging the flow of liquid through or past them when such gelling is effected in a confined or constricted passageway.

A need has long existed for an effective way to gel (within a short time after the need therefor is known) a body of hydrocarbon liquid, e.g. gasoline, kerosene, and oils and fuels generally, so that such liquid will be converted to a gelled solid. The need exists in a wide area of activity in industry, commerce, and the home, in any situation where the ready flow of an oil is undesirable. Such need is well illustrated in the treatment of wells penetrating a fluid-bearing porous earth formation employing an oil-base treating fluid wherein loss by flow of the treating fluid to the formation is sought to be inhibited or controlled. The need is most pronounced at times of fires occurring in the proximity of inflammable organic liquids. The need is especially great for quickly gelling the liquid fuels contained in the tanks of aircraft and other vehicles when a crash is imminent to lessen the extent to which such fuels are spread about an area after impact. Publications concerned with the public safety and welfare have expressed such a specific need, e.g. a booklet entitled Inventions Wanted by the Armed Forces, No. 910, page 4, of May 1959, and published by the National Inventors Council wherein an urgent need therefor is expressed.

The object of the invention, therefore, is to satisfy these and related needs by providing a method of quickly gelling a hydrocarbon liquid. This object is attained according to the invention by converting a hydrocarbon liquid to a non-flowable gel within seconds by admixing abietyl amine and carbon disulfide with said liquid.

The abietyl amine and carbon disulfide may be admixed simultaneously or successively with the hydrocarbon liquid to be gelled. If the presence of either the abietyl amine or the carbon disulfide in a hydrocarbon liquid is not objectionable, e.g. by causing a deposition in an internal combustion engine, either one may be admixed with the liquid which may subsequently be required to be gelled and when gelation is desired, admixing the other additive. It is preferred that the two materials be added simultaneously to effect a rapid thickening. Diffusion of the abietyl amine and the carbon disulfide through the hydrocarbon liquid, however, is very rapid, satisfactory diffusion taking place, when observed in relatively small amounts of a hydrocarbon liquid, appearing to be almost instantaneous. Sufficient mixing takes place for the attainment of the objectives of the invention in containers of the size employed as supply tanks in aircraft, watercraft, and land vehicles, to attain the objectives of the invention within about 30 seconds. It has been observed in practicing the invention that both the abietyl amine and the carbon disulfide diffuse rapidly throughout the body of a hydrocarbon liquid and a few seconds thereafter suddenly effect a gel of the entire body of liquid.

One embodiment of the invention may be described as a method of gelling a hydrocarbon liquid to render it non-flowable and to impart to it the capacity of blocking and plugging the flow of liquid through a confined passageway comprising admixing with said hydrocarbon liquid an amount of abietyl amine and carbon disulfide sufficient to effect the gellation of said hydrocarbon liquid.

Mixing of the abietyl amine and the carbon disulfide with the liquid hydrocarbon may be accomplished by employing many known mixing procedures, e.g. agitating by means of stirrers, sloshing the liquid about by movement of the container, or forcing the abietyl amine and carbon disulfide under pressure, into the body of the liquid hydrocarbon with sufficient force to result in rapid mixing. A particularly effective way of mixing the materials in the practice of the invention is to forcibly inject each of the materials, abietyl amine and carbon disulfide, through individual spargers into the body of liquid hydrocarbon. The turbulence thus brought about is highly satisfactory for the attainment of the objectives of the invention.

The amount of abietyl amine employed in the practice of the invention should be at least 1 part by volume per 100 parts of the liquid hydrocarbon to be gelled. The amount of the carbon disulfide to employ should be at least 0.75 part by volume per 100 parts of the liquid hydrocarbon to be gelled. The upper limit of either the abietyl amine or the carbon disulfide is not highly critical so long as the minimum amounts of each, as stated, are present. However, it is recommended that no more than about 12 parts of the abietyl amine nor more than about 8 parts of the carbon disulfide per 100 parts by volume of the hydrocarbon to be gelled be used. The recommended amounts to use, in the practice of the invention, may be restated as being between 1 and 12 parts of the abietyl amine and between 0.75 and 8 parts of the carbon disulfide per 100 parts of the liquid hydrocarbon. The amount of abietyl amine usually employed is between about 1 and 2 times that of the carbon disulfide, by volume, per 100 parts of the hydrocarbon.

Liquid hydrocarbon, gelled in accordance with the practice of the invention, is sufficiently firm to remain largely intact even if the container is damaged or broken open and will withstand being dropped appreciable distances without breaking up.

The following examples are illustrative of the practice of the invention.

EXAMPLE 1

One hundred milliliters of each of the liquid hydrocarbon petroleum derivatives set out in Table I were placed in a 4-ounce wide-mouth bottle. Two milliliters of abietyl amine were added to the petroleum derivative, lightly stirred and then 3 milliliters of carbon disulfide added to the resulting mixture and again lightly stirred. The temperature for the tests in this example was 76° F. Table I sets forth the complete time which elapsed between the addition of the carbon disulfide and the complete gelation of the petroleum derivatives.

*Table I*

| Test No. | Petroleum derivative | Gelation time in seconds |
|---|---|---|
| 1 | Crude oil, 40° API gravity | 59 |
| 2 | Kerosene | 61 |
| 3 | Diesel oil | 49 |
| 4 | Unethylized regular gasoline | 54 |
| 5 | Ethyl gasoline | 55 |
| 6 | 100 octane gasoline | 54 |
| 7 | Jet fuel | 57 |
| 8 | Naphtha | 45 |

Reference to Table I shows that no longer than about a minute, and in all but one of the tests set out therein less than a minute, was required for complete gelation of the 100 milliliters of liquid hydrocarbon to take place after the addition of the carbon disulfide. The tests set out in Example 1 of Table I show that all common fuels employed in internal combustion engines as well as crude oil and naphtha may be effectively gelled within a short time by the practice of the invention.

The gelation time of a liquid hydrocarbon may be controlled to some extent by the amount of the gelling agents added in accordance with the invention. Tests were run to show the effect of varying the amount of the abietyl amine and carbon disulfide. To 100 milliliters of the liquid hydrocarbon set out in Table II were admixed the amounts of abietyl amine and carbon disulfide shown in the table. The gelation time in seconds is also set out in Table II. The test runs were run at 76° F.

Table II

| Test No. | Hydrocarbon liquid (oil) | Volume of abietyl amine in ml./100 ml. oil | Volume carbon disulfide in ml./100 ml. oil | Gelation time in seconds |
|---|---|---|---|---|
| 9 | Kerosene | 12 | 8 | 11 |
| 10 | do | 9 | 6 | 15 |
| 11 | do | 4 | 1 | 92 |
| 12 | do | 3.5 | 2 | 61 |
| 13 | do | 3 | 2 | 61 |
| 14 | do | 3 | 0.4 | 265 |
| 15 | do | 2.5 | 2.5 | 62 |
| 16 | do | 2 | 3 | 66 |
| 17 | do | 1.5 | 1 | 255 |
| 18 | do | 1 | 4 | 121 |
| 19 | do | 0.5 | 0.75 | (1) |
| 20 | Jet fuel | 6 | 4 | 27 |
| 21 | do | 3 | 2 | 57 |

[1] Gel formed but was fluid.

Reference to the results of Table II shows that the gelation time can be progressively lessened by employing up to 12 milliliters of abietyl amine and 8 milliliters of carbon disulfide per 100 milliliters of hydrocarbon. It also shows that the abietyl amine and carbon disulfide may be decreased, while maintaining a ratio of at least about ⅔ as much carbon disulfide as abietyl amine, down to as little as 1 milliliter of abietyl amine with effective results. It is clear, therefore, that where rapid gelation is highly desirable, up toward 12 parts by volume of abietyl amine and 8 parts by volume of carbon disulfide per 100 parts by volume of the liquid hydrocarbon to be gelled is recommended. Appreciably more than 12 parts by volume of the abietyl amine and 8 parts by volume of the carbon disulfide can be employed per 100 parts by volume of the hydrocarbon but increasing benefits resulting from such increased amounts appear doubtful.

Since time is not always available to adjust the temperature of the liquid hydrocarbon to be gelled, the usefulness of the invention, therefore, would be lessened if it were operable only within a narrow range of temperatures. To show the effect of the practice of the invention at varying temperatures, a series of test runs was made. 100 milliliters of either kerosene or jet fuel, as designated in Table III, were employed. Abietyl amine and carbon disulfide were admixed therewith in the amounts and at the temperatures set forth in Table III. The gelation times were ascertained and are also set out in Table III.

Table III

| Test No. | Hydrocarbon liquid (oil) | Amount of abietyl amine in ml./100 ml. of oil | Amount of carbon disulfide in ml./100 ml. of oil | Temp. in ° F. | Gelation time in seconds |
|---|---|---|---|---|---|
| 22 | Kerosene | 3 | 2 | 115 | 40 |
| 23 | do | 3 | 2 | 76 | 61 |
| 24 | do | 3 | 2 | 40 | 140 |
| 25 | Jet fuel | 3 | 2 | 76 | 57 |
| 26 | do | 6 | 4 | 76 | 27 |
| 27 | do | 3 | 2 | 40 | 140 |
| 28 | do | 6 | 4 | 40 | 50 |
| 29 | do | 4 | 4 | 0 | 210 |

A study of Table III shows that the higher temperatures bring about complete gelation within less time when the lower temperatures were employed. However, gelation was effected at a temperature as low as 0° F. within 3.5 minutes. The table further shows that temperatures of about room temperature, viz., 76° F., are suitable for a rapid gelation of the oil, e.g. in less than 0.5 minute, in accordance with the invention. The temperatures of fuels stored in tanks in the proximity of internal combustion engines during operation is likely to rise above room temperature and therefore such fuels gel when subjected to the treatment in accordance with the invention more rapidly than at room temperature.

A series of tests was run to ascertain the firmness of the gels formed according to the invention. Gels were formed with one of kerosene, jet fuel, or high octane aviation gasoline. 100 milliliters of the oil were employed at 76° F. The amount of abietyl amine and carbon disulfide employed are set out in Table IV. After the gels were formed, their firmness was ascertained according to a modification of the ASTM test designated D5–52 entitled "Penetration of Bituminous Material" as described in ASTM Standards, 1952, Part 3, page 1331. This test, as described in the ASTM Standards, calls for a needle 1 millimeter in diameter. This test was modified for use in this series of runs by employing a blunt end steel rod having a diameter of 12 millimeters. The ASTM procedure described for this test was otherwise adhered to. The results of the test expressed in depth of penetration of the steel rod into the gelled hydrocarbon oil in millimeters when subjected to a measured force in grams are set out in Table IV.

Table IV

| Test No. | Hydrocarbon liquid (oil) | Amount of abietyl amine in ml./100 ml. of oil | Amount of carbon disulfide in ml./100 ml. of oil | Grams load on needle | | | |
|---|---|---|---|---|---|---|---|
| | | | | 72 | 12 | 172 | 222 |
| | | | | Penetration, in millimeters, of vicat needle | | | |
| 22 | Kerosene | 4 | 1 | 0 | 0 | 0 | 0 |
| 23 | do | 3 | 2 | 0 | 0 | 0 | 0 |
| 24 | do | 2 | 3 | 1 | 1 | 1 | 1 |
| 25 | do | 1 | 4 | 445 | (1) | (1) | (1) |
| 26 | Jet fuel | 3 | 2 | 0.5 | 1 | 1 | 1 |
| 27 | 100 octane gasoline | 3 | 2 | 0 | 0.5 | 1 | 1 |

[1] Too easily penetrated to be accurately measured.

Reference to the resistance to the needle penetration, as set out in Table IV, into the oil thus gelled in accordance with the invention clearly supports the conclusion that the gel formed thereby is sufficiently firm to withstand appreciable pressures without breaking apart and is assuredly sufficiently firm to resist flowing.

Tests were run to show the resistance to breakage upon impact by bodies of fuel, gelled in accordance with the invention. The tests consisted of preparing a number of gelled samples, 3½ inches in diameter and 1 inch long, by admixing 6 parts of abietyl amine and 4 parts, by volume, of 100 octane aviation gasoline and dropping the gelled samples so made 8 feet onto a concrete surface. The samples thus dropped remained completely intact except for minute fragments representing less than 1 percent of the volume of the cylindrically shaped gelled samples.

In hydraulically fracturing the producing formation of a well employing an oil-base treating fluid, it is highly desirable that the loss of treating fluid to the formation be controlled. To show the suitability of the practice of the invention in the treatment of wells penetrating fluid-bearing formations a series of tests were run. The apparatus described in API RP 29 Recommended Practice for Standard Procedure for Testing Drilling Fluids, Section IV, Filtration, was employed as a basis for determining fluid loss. 100 milliliters of kerosene, to which were admixed 3 milliliters of abietyl amine and 2 milliliters of carbon disulfide, were placed in the container of the apparatus and the filtration rate, at a pressure of 100 p.s.i. and at a temperature of 80° F., determined according to the API RP 29 test procedure. The filtration rate, thus determined, was 17 milliliters in 30 minutes. This filtration rate indicates a fluid loss to a porous formation which is considered low and definitely acceptable in the art of well treatment for satisfactorily plugging off channels and passageways in a formation to prevent, or substantially lessen, fluid loss.

Although the more flammable and explosive liquid hydrocarbons are not rendered non-flammable or necessarily non-explosive by treatment in accordance with the invention, flammability is definitely decreased and rate of burning lessened by such treatment and the danger of rapidly spreading fires substantially reduced.

The practice of the invention offers a number of advantages of inestimatable value. Illustrative of such advantages are the effective treatment of wells and porous formations; the gelling of flammable hydrocarbon liquids in storage and in transit where it is desirable to stop the flowage thereof when such flowage would endanger personnel or property loss. The latter use is of especial significance when used as a safety measure for solidifying flammable or explosive hydrocarbon liquids in tanks and fuel lines supplying fuel to motors in airplanes, automobiles, diesel powered trucks and locomotives, and watercraft, when impact or exposure to high heat is about to be encountered. The system for the immediate injection of the abietyl amine and carbon disulfide into the fuel supply can conveniently be made a part of the equipment of vehicles, planes, and the like where danger from burning or explosive fuels exists, which means could be put into operation in a moment's notice and thereby effect a gel of the oil and substantially lessen scattering of the liquid fuels.

Having described the invention, what I claim and desire to be protected by Letters Patent is:

1. The method of gelling a hydrocarbon liquid confined in a passageway, to render the hydrocarbon non-flowable and to impart to it the capacity of blocking and plugging the flow of liquid through the passageway, consisting essentially of intermixing with the hydrocarbon in the passageway abietyl amine and carbon disulfide in an amount of each sufficient to provide at least 1 part by volume of abietyl amine and at least 0.75 part by volume of carbon disulfide at a temperature between about 0° F. and 115° F.

2. The method of effecting gelation in an oil-base well-treating fluid to control the fluid loss therefrom into a porous formation during treatment consisting essentially of injecting into said well-treating liquid at least about 1 part by volume of abietyl amine and at least about 0.75 part by volume of carbon disulfide to effect gelation of at least a portion of said well-treating fluid in the formation and thereby inhibiting loss of the well-treating fluid into the porous formation.

3. The method of effecting gelation of a hydrocarbon liquid fuel confined in a fuel tank by injecting into said fuel tank, at sufficient pressure to create turbulence therein, at least about 1 part by volume of abietyl amine and at least about 0.75 part by volume of carbon disulfide per 100 parts of said fuel and thereby render liquid fuel substantially non-flowable.

4. The method according to claim 3 wherein the abietyl amine and carbon disulfide are substantially simultaneously released under pressure into the fuel in said fuel tank in an amount of between 3 and 12 parts of said abietyl amine and between 2 and 8 parts of said carbon disulfide per 100 parts by volume of said fuel and in a ratio of about 3 parts of the abietyl amine to about 2 parts of the carbon disulfide.

References Cited in the file of this patent
UNITED STATES PATENTS

| | | |
|---|---|---|
| 2,046,884 | Semon | July 7, 1936 |
| 2,368,106 | Bergen | Jan. 30, 1945 |
| 2,668,098 | Alm | Feb. 2, 1954 |
| 2,675,354 | McChrystal et al. | Apr. 13, 1954 |